(12) United States Patent
Sangameswaran et al.

(10) Patent No.: US 10,002,082 B2
(45) Date of Patent: Jun. 19, 2018

(54) METHOD AND APPARATUS FOR CYCLICAL KEY-OFF FILE REPLACEMENT

(71) Applicant: FORD GLOBAL TECHNOLOGIES, LLC, Dearborn, MI (US)

(72) Inventors: Sangeetha Sangameswaran, Canton, MI (US); John Naum Vangelov, South Lyon, MI (US); Jason Michael Miller, Woodhaven, MI (US); Brunilda B. Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/047,756

(22) Filed: Feb. 19, 2016

(65) Prior Publication Data

US 2017/0242801 A1    Aug. 24, 2017

(51) Int. Cl.
*G06F 11/00* (2006.01)
*G06F 12/12* (2016.01)
*G06F 11/14* (2006.01)
*G06F 12/02* (2006.01)

(52) U.S. Cl.
CPC .......... *G06F 12/12* (2013.01); *G06F 11/1446* (2013.01); *G06F 12/0246* (2013.01); *G06F 2201/805* (2013.01); *G06F 2212/2022* (2013.01); *G06F 2212/69* (2013.01)

(58) Field of Classification Search
USPC ........................................................ 714/6.12
See application file for complete search history.

(56) References Cited

U.S. PATENT DOCUMENTS

| | | |
|---|---|---|
| 7,366,589 B2 | 4/2008 | Habermas |
| 2004/0181560 A1* | 9/2004 | Romanufa ........ G06F 17/30368 |
| 2005/0166088 A1* | 7/2005 | Yamagami ............ G06F 3/0601 |
| | | 714/6.13 |
| 2011/0173457 A1 | 7/2011 | Reh |
| 2012/0015642 A1 | 1/2012 | Seo |
| 2014/0282467 A1 | 9/2014 | Mueller et al. |
| 2014/0372799 A1* | 12/2014 | Wei .......................... G06F 8/68 |
| | | 714/19 |
| 2016/0011930 A1* | 1/2016 | Yeh ..................... G06F 11/0793 |
| | | 714/15 |

\* cited by examiner

*Primary Examiner* — Sarai E Butler
(74) *Attorney, Agent, or Firm* — Jennifer Stec; Brooks Kushman P.C.

(57) ABSTRACT

A system includes a processor configured to erase external working memory and program a target image of an authenticated update file into the erased working memory. The processor is also configured to erase a first internal memory location, containing data to be replaced by an update, and program portions of the target image to the first internal memory location for finite time periods following a plurality of key-offs, until a full target image is programmed in internal memory.

20 Claims, 5 Drawing Sheets

METHOD AND APPARATUS FOR CYCLICAL KEY-OFF FILE REPLACEMENT

TECHNICAL FIELD

The illustrative embodiments generally relate to a method and apparatus for cyclical key-off file replacement.

BACKGROUND

Many vehicles include vehicle telematics units and vehicle computing and infotainment systems that allow for integration of applications from remote sources, playback of media and content in a vehicle, communication with remote sources, and generally provide a more favorable driver experience. These systems and other vehicle electronic control units (ECU) may use updateable software/firmware components that utilize updates to provide compatibility among components, among other things. Customers may be required to visit the dealer to perform diagnostics and updates on the vehicle computing systems. This may require physically connecting the vehicle to an update system to have the updates installed by the dealer. This allows the dealer to ensure that the most recent modules and versions are installed and allows the original equipment manufacturer (OEM) to obtain a snapshot of the current software and firmware versions installed on a vehicle.

Often, a vehicle ECU will only contain a single on-board flash memory, usable to execute instructions, boot, configure the ECU, etc. If this memory is over-written, during an update, the contents thereof cannot be restored. If the update results in an error, the old code or another version of the new code may need to be downloaded before the ECU will be functional again.

SUMMARY

In a first illustrative embodiment, a system includes a processor configured to erase external working memory and program a target image of an authenticated update file into the erased working memory. The processor is also configured to erase a first internal memory location, containing data to be replaced by an update, and program portions of the target image to the first internal memory location for finite time periods following a plurality of key-offs, until a full target image is programmed in internal memory.

In a second illustrative embodiment, a system includes a processor configured to erase external working memory and program a target image of an authenticated update file into the erased working memory. The processor is also configured to erase first internal memory locations, containing data to be replaced by an update, and program the internal memory locations with portions of the target image in response to each of a plurality of key-offs until the target image has been completely programmed to the internal memory.

In a third illustrative embodiment, a system includes a processor configured to erase external working memory and program an update file image into the working memory. The processor is also configured to determine a minimum amount of internal memory to erase and program with a portion of the image to complete image programming within a predetermined number of key-off cycles. The processor is further configured to erase and program at least the determined minimum amount of internal memory during a plurality of key-off cycles until the image is programmed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
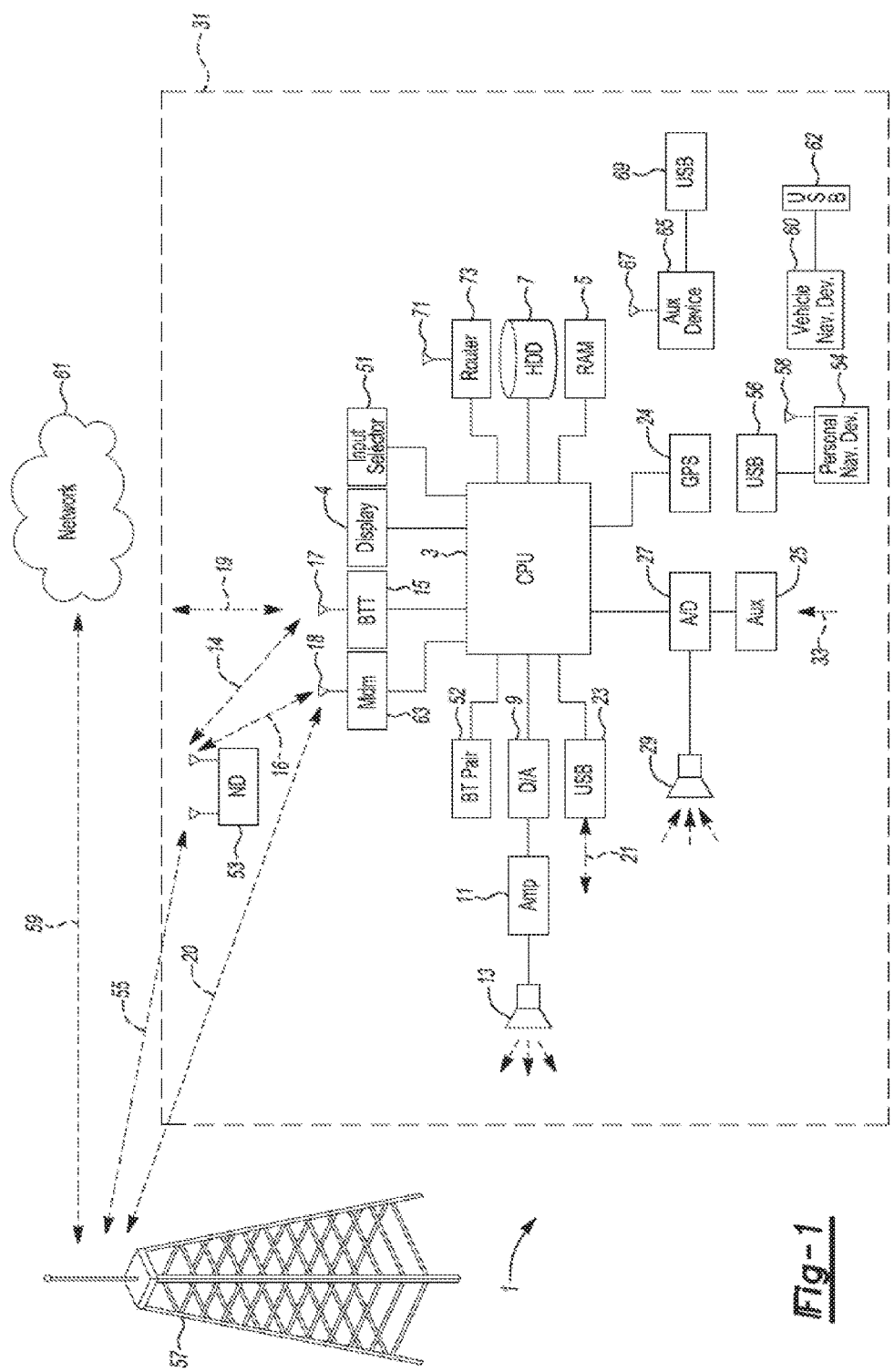
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

While current vehicle computing systems allow for complete updating of software and firmware via a dealer interface, such systems also require that the customer visit a dealer or other licensed service provider. This can create a delay in obtaining updates, as customers will frequently wait until the vehicle needs physical servicing, is due for an oil change or tire rotation, or simply fail to have the software updated altogether. Since the software and firmware updates frequently improve performance, customers may not be getting the full, optimal experience from their vehicle unless they make it a point to keep their software up to date, which, under the dealer-update model, may require frequent trips to a dealer or maintenance location for updating.

The illustrative embodiments provide exemplary systems and methods for obtaining over-the-air (OTA) updates that allow a customer to update vehicle software without having to visit a dealer. The proposed solutions and examples provide an efficient and reliable means of updating vehicle software and firmware, with minimal customer interaction and impact. Also, the OEM can track which updates have been provided and/or applied to which vehicles, so it is possible to have a good sense of which software and firmware versions are highly prevalent in deployed vehicles, which can assist in focusing update efforts and allow for early identification of issues and notification of the appropriate parties if, for example, any version-specific issues arise.

Figure 2A:
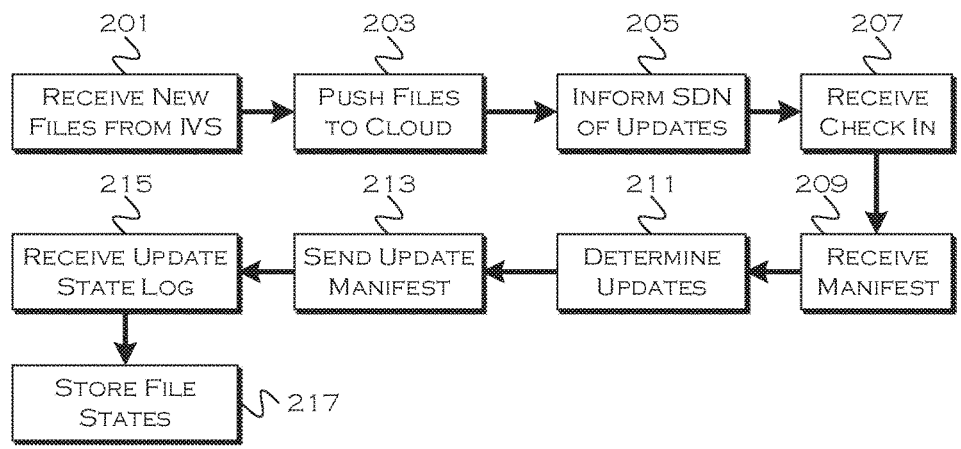
FIG. 2A shows an illustrative cloud-side process for providing a vehicle software/firmware update.

FIG. 2A shows an illustrative cloud-side process for providing a vehicle software/firmware update. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, an OEM engineer or other party designated to provide software and firmware updates can upload the software to an initial system repository, such as an in-vehicle software system (IVS) that is designated to receive updates from one or more parties. These files are then sent to a global in-vehicle information system (GIVIS) where the software can be stored for download by vehicle tools. After the GIVIS system receives the software from the IVS system 201, the GIVIS system can push the software to the cloud 203, which is where the software can be provided to remotely connected vehicle telematic control units (TCU)s.

In addition to pushing the files to the cloud (or otherwise making the files wirelessly available), the GIVIS system can tell a service delivery network (SDN) to inform particular vehicles that an update to an installed software or firmware package is available 205 for download and installation.

In the illustrative embodiments, the backend OEM systems track which modules and versions are installed on a variety of vehicles that have allowed for OTA updates. This is information that can be received, for example, from a vehicle TCU and stored in a remote OEM database. For vehicles whose configuration is known, the SDN can identify which vehicles are appropriate for an update (based on known, installed software and firmware versions) and can send a message to those vehicles that a new package is ready for download. For other vehicles, that may not have reported yet, for example, the system can identify vehicles for updating based on initial builds, and can notify those systems as well. Since, in this example, the process will vet the installed software before providing the update, any incompatibility can be handled when the system is informed of the actual configuration.

As identified vehicles come online (e.g., without limitation, they are keyed-on), they can check-in with the update server based on the notification from the SDN, for example. The system receives the check-in 207 and a manifest of installed software and firmware on the vehicle 209. This could be a full list, or, in another example, could relate specifically to software packages and firmware packages which have been designated for update. The full list will provide the OEM with a current snap-shot of the vehicle, but the short list may take less time to assemble and transmit. The report can be configured as desired based on the trade-offs between transmission time, completeness, data-volume, etc.

Figure 2B:
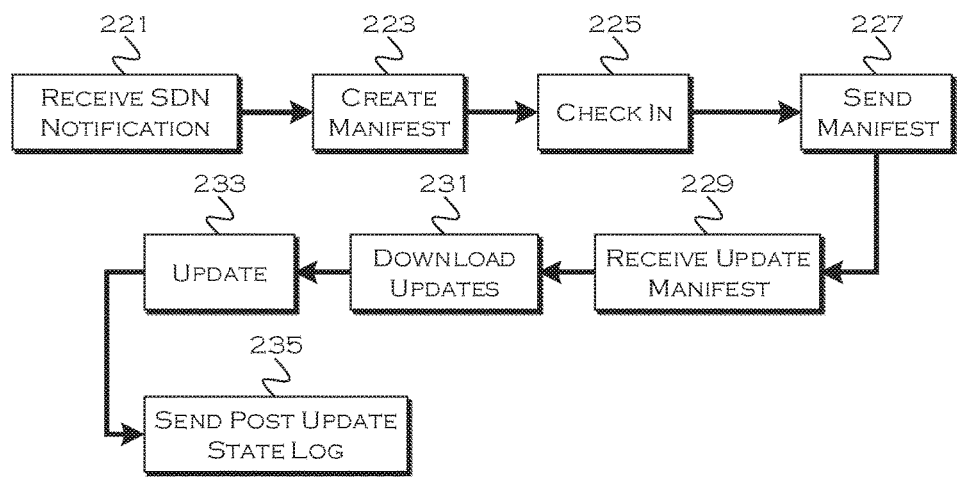
FIG. 2B shows an illustrative vehicle-side process for update handling.

Once the manifest is received from the vehicle 209, the process can determine which software and firmware is appropriate for updating, and assemble a list of available updates 211. This update manifest, identifying the updateable software/firmware and/or versions available for download, can then be sent to the vehicle 213. As shown in FIG. 2B, the vehicle will download appropriate software and, at some point when appropriate, install the software updates. Once the software updates have been successfully installed, the process will receive a state log identifying the success or failure of various update installations 215. This can be at a later point in time, since, for example, the download may occur at key-on and the install may occur at key-off (when the vehicle is not being used). The remote system can then store an updated snapshot 217 of some or all of the installed versions of software and firmware (depending on how much data is provided in the initial manifest and the update state log).

FIG. 2B shows an illustrative vehicle-side process for update handling. With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process is a vehicle-side process which may not necessarily run to completion without pausing (i.e., there may be significant time-gaps between certain steps). The vehicle is notified, typically through the vehicle TCU, that an updated software package is available for that vehicle 221. This SDN notification can be used to place the vehicle in a state where the vehicle will check for an update when the vehicle is next keyed-on, for example.

At key-on, in response to the SDN notification, or at another appropriate time, the process will create a manifest of existing software and firmware versions installed on the vehicle 223. This can be a complete list of software and firmware, or can be limited, for example, to the versions of software and firmware for which an update is available. A third example of a list could be the versions of updateable software and firmware, as well as the versions of other modules that might be required for compatibility purposes (e.g., even if module Z is not updateable, it might have to be in version 2.0.1 for an update to module N to preserve compatibility, so the versions of both Z and N might be provided). Then, again at key-on or other designated time, the process will check-in with the GIVIS cloud 225 (or other software/firmware providing service) to obtain the updated software.

The process sends the manifest of installed versions to the GIVIS system 227, which allows the GIVIS system to check to ensure, for example, that the database record of installed software is correct. If the vehicle system has an unexpected updated version (which, for example, the user may have manually installed), the update may be aborted, or changed to a different update. Once the appropriateness of the updates has been verified or corrected, the vehicle system will receive an update manifest containing a list of the updateable software modules available for download 229.

The vehicle system will then download the appropriate updates (which could be all updates or some system or user selected subset thereof) 231. At some point the updates will also be installed 233, although as previously noted this could be at a different time. Since updates to vehicle modules may affect drivability while being installed, it may be desirable to wait until a vehicle is not being used (such as at key-off) before installing the updates. In another example, for a quick update, the system may simply prevent driving for a limited period of time while an update is applied. This latter model could be used, for example, when a high-priority security update is downloaded for installation, or at any other appropriate time. Once the updates have been installed, the process can send a post-update log to the GIVIS system 235, which can include the success or failure of updates, and may also include another full listing of presently installed software and firmware modules, if desired to maximize information about a present vehicle configuration.

Although not shown, it is also possible, for example, for the process to log or record the transmission of certain software version updates to a vehicle. This can help, for example, in identifying an update issue if a vehicle repeatedly receives updated versions but fails to successfully apply the update upon attempting an update.

Figure 3:
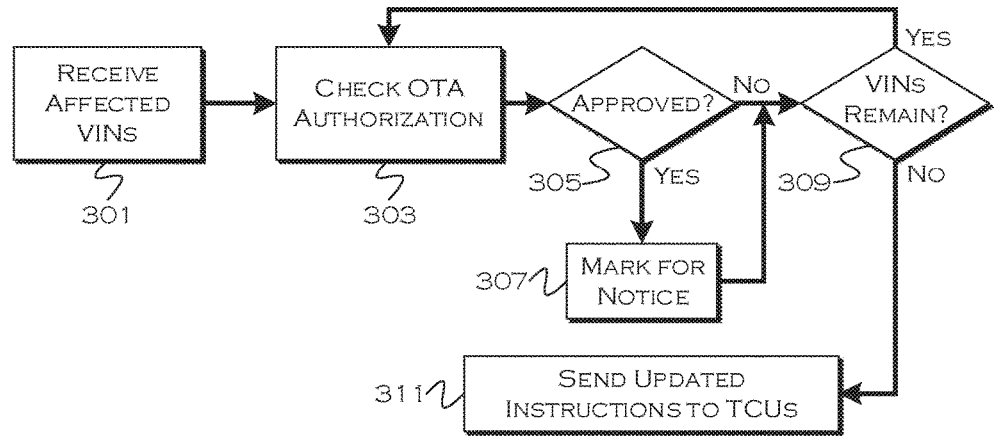
FIG. 3 shows an illustrative process for update notification.

FIG. 3 shows an illustrative process for update notification. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process runs on a service delivery network or other communication system designated for notifying vehicles about the availability of new updates. In this example, the process receives (or retrieves) the vehicle identification numbers (VIN)s of vehicles affected by a particular update 301.

The software and firmware configuration for each vehicle is stored in a database that may be populated and updated using various sources (from vehicle-reporting, dealer-reporting, known installed versions at production, etc.). The database can be queried, for example, to identify vehicles having a particular version of software N installed, such as vehicles having version 2.0.3, for example, to which a new update 2.0.4 is to be applied. In other examples, all vehicles having versions at or lower than 2.0.3 might be identified as candidates for updating to 2.0.4, depending, for example, on the particular update.

The vehicles can be identified by VIN, which can also be used to look up communication data allowing for messages to be sent to the specific, VIN-identified vehicles. In this example, to prevent notification to users who do not want OTA updates, the process checks each VIN to see if the user has agreed to the OTA updates 303. VINs that are not in the database may correspond to users that have not yet approved OTA updates, or that may not want OTA updates for a variety of reasons (such as a fleet manager who wants all vehicles at a same version level). If a given VIN has an approval associated therewith 305, the SDN can add that VIN to a list for notification 307. This process can continue as long as VINs remain 309 for approval verification. Once the VINs that have approved OTA updates have all been verified, the process can send update instructions, notifications, etc. 311 to the vehicles having the associated VINs.

Figure 4:
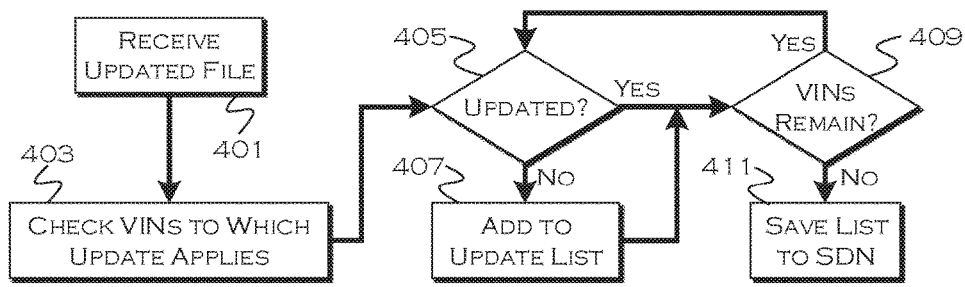
FIG. 4 shows another illustrative update notification process.

FIG. 4 shows another illustrative update notification process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on the GIVIS, for example, receives an updated file from an OEM engineer or other party designated to provide updates 401. In this example, the GIVIS stores the records (or accesses the database storing the records) of vehicle configurations, and will simply provide a list of applicable VINs to the SDN for notification (which is the representative process described with respect to FIG. 3). Here, the process utilizes a database to determine which vehicles (by VIN, in this example) have software eligible for the received update 403. In this example, the process first sorts by software module 403, to determine which vehicles have the updateable module installed. Then, for each vehicle, the process determines if the software has already been updated 405 or is otherwise an inappropriate state for updating. If the software is already updated or is otherwise in an inappropriate state for updating 405, the process will continue to the next record 409. Otherwise, the VIN for that vehicle is added to an update list 407 to be sent to the SDN. Of course, any method of querying a database and assembling a list of records can be used, as the process shown is merely illustrative. Once all records have been analyzed, the process can send the list of appropriate VINs to the SDN, which can check for stored OTA approval as shown in FIG. 3. Although the GIVIS process in FIG. 4 and the OTA approval verification shown in FIG. 3 are described with respect to separate systems, they can be consolidated if desired and appropriate, depending on the layout and configuration of the back-end network providing the OTA software updates.

Figure 5:
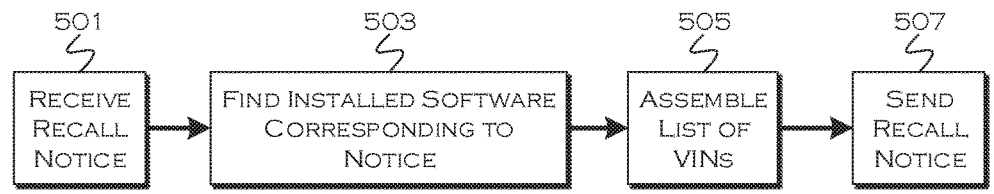
FIG. 5 shows an illustrative process for recall handling.

FIG. 5 shows an illustrative process for recall handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

FIG. 5 shows an illustrative recall notification process facilitated by having a more up-to-date record of currently installed software and firmware versions. While this could be used with any set of records reporting software and firmware versions installed in vehicles, the more up-to-date the records, the more accurate the delivery of the recall notices. If an OEM does not have any information about current software versions, for example, they may have to send a recall notice to all vehicle models having some version of a particular software or firmware module needing a particular update. On the other hand, if the update only applies, for example, to version 3.3.1, a complete or more-complete set of records can avoid issuing a recall notice to at least some vehicles for which the notice is inappropriate. For vehicles whose current configuration is unknown, or for which it has been a long time since update, the process may still choose to send the notice out of an abundance of caution. However, the process can avoid sending notices to vehicles for which it is known that the update has already been applied and/or which have versions that are past the version needing updating (3.3.2, for example).

The process receives a recall notice that applies to a particular software or firmware module installed in certain vehicles 501. Using database queries such as those previously described, the process can identify which vehicles are known to need an update, or, additionally or alternatively, which vehicles do not need an update 503. The process then can assemble a list of VINs for which notification should be sent (or in an alternative configuration, a list of VINs for which a notice is definitely not needed) 505. This list, in either form, can be used to limit the list of vehicles to which notification is sent, so at least some drivers are not unnecessarily notified about a recall which does not apply to their vehicle. The recall notice can then be sent to the appropriate vehicles.

As noted, there may still be some overlap and redundancy in notification using this process, based on incomplete information, but the better the information received from customer vehicles and dealer updates, for example, the more accurately targeted the recall notification can be. Similar methodologies can also be used for other targeted vehicle messaging, based on knowing which modules and versions are installed on which particular vehicles. Because the OTA updates allow for more frequent servicing of software and firmware modules without requiring the customer to make a trip to the dealer, the increased frequency can provide increased snapshot accuracy if such information is collected by the OEM.

In one contemplated update model for vehicle software replacement, multiple executable memory locations are considered. A vehicle system will utilize, for example, location A while a new file for utilization in replacement of the file in location A is downloaded and installed at location B. In order to support this, the system will execute code in location A, while writing to memory at location B. If this is not supported by a vehicle computing system, the illustrative embodiments provide for a different model that provides similar results (i.e., storage of the new code at location B for eventual execution) while allowing the old code at location A to still be utilized until the code at location B is fully written. To do so, the process will cyclically delete and replace any data currently at location B upon successive key-off cycles. Since, in this example, the system may not be able to execute code at location A while writing to location B, a finite time window is utilized at key-off to perform a portion of the delete-write process until location B is written with fully executable code. Because the vehicle may be unusable during this time window (since the code at location A cannot be executed while B is being deleted/written), the time window is kept to a reasonably small duration (determined by an OEM, for example, or user-specified as a tolerable delay), so as not to overly inconvenience a driver. This could be a few seconds, a minute, etc.

Figure 6:
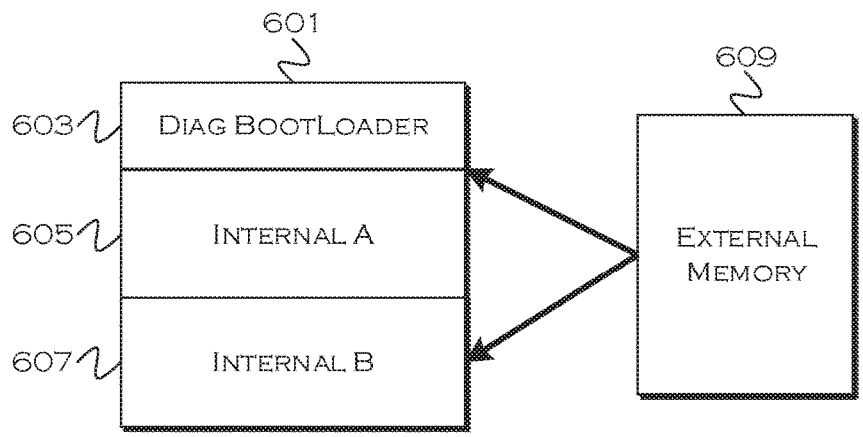
FIG. 6 shows an illustrative vehicle memory system.

FIG. 6 shows an illustrative vehicle memory system. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the system contains internal memory 601, from which a bootloader 603 can execute code stored at a present location A 605. If a new update is provided, it can be provided at location B 607, leaving a backup of the old code at location A, in case there is a problem with the update provided to location B. The ECU or other system executing the code can, once the code is written fully to location B, be instructed to now utilize the code written to location B for execution. If there is any error with the update, the ECU or other system can revert to utilization of the code at location A.

The update can be stored in a working external flash memory 609. This external memory can persist through vehicle power-offs, so the code from the full update, or any portion thereof, written to external memory 609, will persist through power loss, allowing for cyclical updating through multiple power cycles. External memory can be a secondary memory source provided to the vehicle computing system for use in varied updates, or it can be module-specific, provided to one or more ECUs as secondary memory, other than the flashable/writeable boot memory used by a particular vehicle ECU for initialization.

Figure 7:
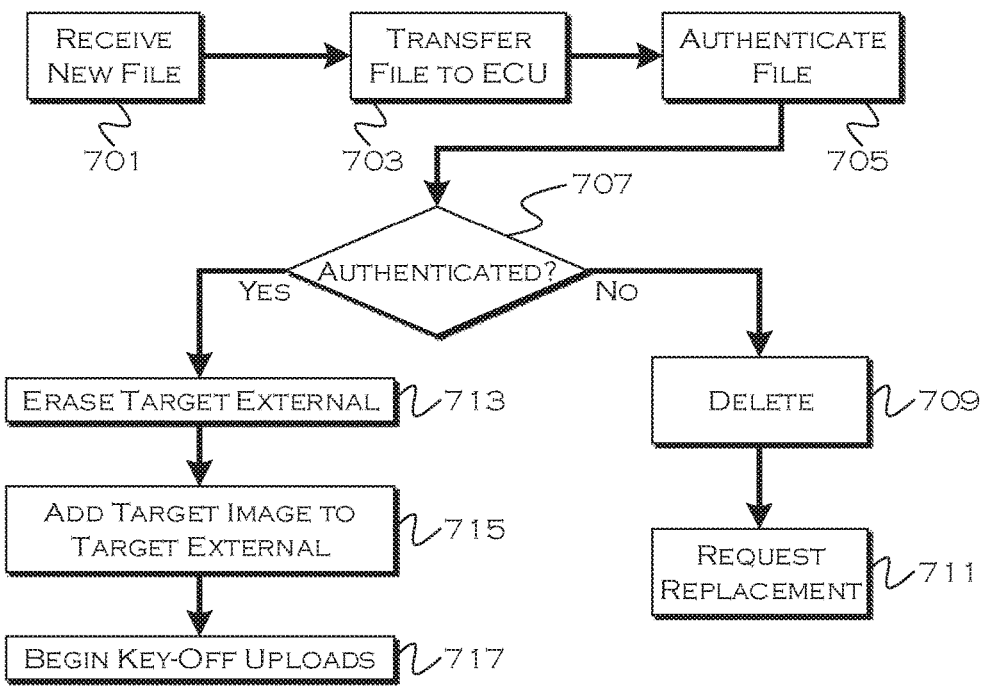
FIG. 7 shows an illustrative process for update-file storage.

FIG. 7 shows an illustrative process for update-file storage. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

When a new file that provides an updated set of code is received 701, the process transfers the file from a connectivity module (which communicates with the cloud for OTA updates) to a target ECU, which will eventually utilize the file 703. The file is authenticated once fully received (both to ensure receipt of the entire file and to ensure that no errors occurred during the transfer process) 705.

If the file is not authenticated 707, the process can delete the file 709 without attempting to write the file to a new internal memory for use by the ECU. This step can save some time by avoiding writing a bad file, but there is also an authentication process after the write in this embodiment, to further ensure appropriate file delivery. If the file was not authenticated (e.g., there was an error, a source was not identified, or some other issue occurred), the ECU and/or connectivity module can request a replacement of the file 711.

If the file is authenticated by the ECU, the process can erase an external working memory 713. This external flash memory persists through power-down, and will be used to program the update back to an internal memory location for eventual use by the ECU. A target image of the new file is programmed into the newly erased external working memory 715. At this point, a key-off update process 717 can begin.

Figure 8:
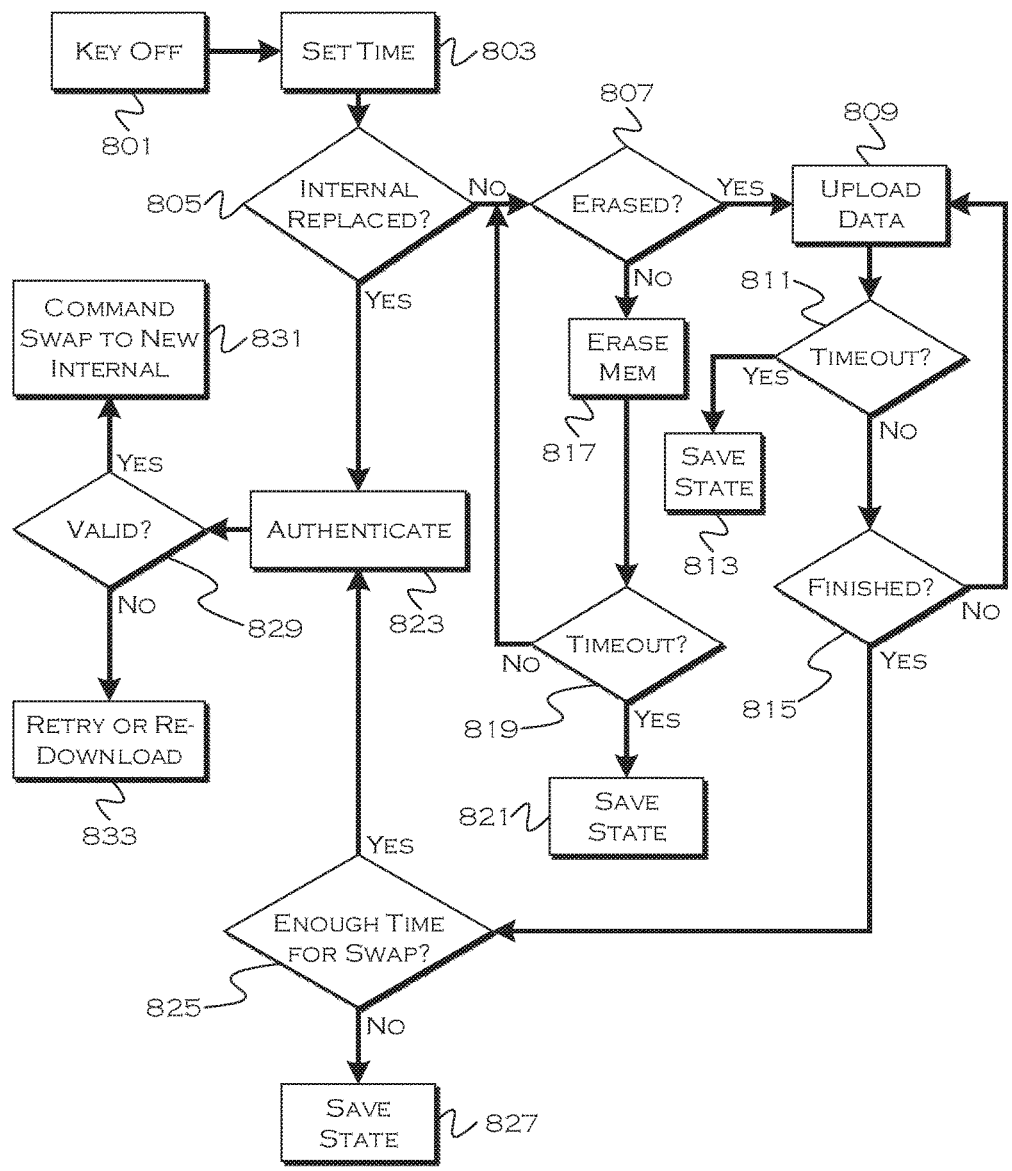
FIG. 8 shows an illustrative process for key-off cyclical file replacement.

FIG. 8 shows an illustrative process for key-off cyclical file replacement. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process will iteratively free up memory and program a new file into internal memory for eventual use by a vehicle ECU or other system. In this example, the process will suspend use of the vehicle for a time while memory writing is occurring, and since the memory deletion and programming process may take some time, it may be undesirable to leave the vehicle unusable for the entire period of time. Resultantly, the process utilizes multiple small time windows at key-off to complete the process, and, when the deletion and programming is completed, and a new file is ready for use by the ECU, the ECU can switch to using the new file now in internal memory.

After the key-off is detected 801, the process sets a timer 803 during which any update action can be taken. In another example, instead of setting a timer, a finite amount of memory is erased or written, calculated to be completable in an acceptable time window. In still another example, the system may be designed to complete update in a maximum number of cycles, so any deletion, programming and verification may be broken into a fixed number of cycles with fixed or varying amounts per cycle, even if a standard time limit or data amount is exceeded, to ensure that the update is completed over a certain total number of cycles.

In this example, if the internal memory located at location B has not been fully replaced (i.e., the programming is not completed) 805, the process will check to see if any old data at this location has been fully erased 807. There are numerous methodologies to determine if old data targeted for erasure has been completely erased, any of which are suitable for use in the illustrative embodiments.

If the old data is not yet fully erased, the process will continue to erase the data stored in internal memory at location B for the finite period of time 817. If a timeout occurs (the finite period of time lapses) 819, or if another model is used (such as erasing a finite amount of memory and the amount of memory is erased), the process will save the state of the update 821 and exit. This can be used to continue the update process at the next key-off cycle, although algorithms that determine the state of the update can also be used in lieu of actually saving the state.

If the timeout does not occur and/or the amount of memory to be deleted is not reached (i.e., the deletion completes before the full amount of time or deletion is "used"), but there is no data left to erase, then the process can proceed to begin programming the new data to internal memory location B 809.

During the programming of the new data to the memory location B, if a timeout occurs (the time limit is reached) 811, or if another write limitation is reached, the system can again save the state of the update 813 and exit. Otherwise, the programming will continue until the programming is complete 815.

In this example, the ECU will also authenticate the new target image programmed to location B in the internal memory. Because this may take some time, a separate cycle may be assigned to this verification step if there is insufficient time remaining to complete the authentication and complete a swap to the new code 825. Accordingly, if insufficient time (or other control-factor) remains 825, the process will again save the state and wait for the next key-off cycle 827.

If sufficient time remains 825, or if the vehicle was keyed-off after the previous key-off cycles resulted in an updated but not verified location B 805, the process can begin to authenticate the target image now programmed to internal memory location B 823. If the target image is authenticated 829, the process can instruct the ECU to swap to utilization of the code now written at location B 831. If the target image fails authentication 829, the process can retry the deletion and write 833, or re-download the update and start the process over. Since the original code in location A was not overwritten, the ECU can continue to use the code at location A until the code at location B is authenticated. Also, if any error occurs while using the code at location B, a backup of the old, working code at location A is still present at location A, for reversion use by the ECU if needed.

While a single process has been shown in FIG. 8, multiple vehicle modules may actually be involved in the update process. For example, without limitation, a connectivity module may first receive the update file and transfer the file to a target ECU. The target ECU may perform the verification and erasure of external memory, as well as loading the code for erasure and programming of the internal memory location (which may, for example, be loaded into RAM upon key-off). The ECU may perform the authentication of the new target image, once programmed into internal memory location B, and then the connectivity module may instruct the ECU to swap to the new, authenticated target image. Other variations of this paradigm may be implemented as well, using these and other modules and vehicle systems, resulting in the illustrative outcome (a new target image is used for execution by a vehicle system, while the old image persists for reversion purposes if needed).

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated.

What is claimed is:

1. A system comprising:
a processor configured to:
erase external working memory and program a target image of an authenticated update file into the erased working memory; and
erase a first internal memory location, containing data to be replaced by an update, and program portions of the target image to the first internal memory location for finite time periods following a plurality of key-offs, until a full target image is programmed in internal memory.

2. The system of claim 1, wherein the working memory is flash memory.

3. The system of claim 1, wherein the processor is configured to use the entire target image as new executable code to in place of a previous version stored at a second internal memory location.

4. The system of claim 3, wherein the processor is affiliated with an electronic control unit and a connectivity module instructs the processor to use the entire target image as the new executable code in place of the previous version stored at the second internal memory location.

5. The system of claim 3, wherein the processor is configured to revert to the previous version for use as executable code if an error occurs while using the entire target image as new executable code.

6. The system of claim 1, wherein the processor is configured to save a current state of an update process upon expiration of each of the finite time periods.

7. The system of claim 6, wherein the processor is configured to resume the update process during a subsequent key-off based on the saved current state from a previous key-off.

8. A system comprising:
a processor configured to:
erase external working memory and program a target image of an authenticated update file into the erased working memory; and
erase first internal memory locations, containing data to be replaced by an update, and program the internal memory locations with portions of the target image in response to each of a plurality of key-offs until the target image has been completely programmed to the internal memory.

9. The system of claim 8, wherein the working memory is flash memory.

10. The system of claim 8, wherein the processor is configured to use the entire target image as new executable code in place of a previous version stored at a predetermined internal memory location.

11. The system of claim 10, wherein the processor is affiliated with an electronic control unit and a connectivity module instructs the processor to use the entire target image as the new executable code in place of the previous version stored on the internal memory.

12. The system of claim 10, wherein the processor is configured to revert to the previous version for use as executable code if an error occurs while using the entire target image as new executable code.

13. The system of claim 8, wherein the processor is configured to save a current state of an update process in response to expiration of a time period after each key-off during which the erasure and programming of internal memory occurred.

14. The system of claim 13, wherein the processor is configured to resume the update process during a subsequent key-off based on the saved current state from a previous key-off.

15. A system comprising:
a processor configured to:
erase external working memory and program an update file image into the working memory;
determine a minimum amount of internal memory to erase and program with a portion of the image to complete image programming within a predetermined number of key-off cycles; and
erase and program at least the determined minimum amount of internal memory during a plurality of key-off cycles until the image is programmed.

16. The system of claim 15, wherein the working memory is flash memory.

17. The system of claim 15, wherein the processor is configured to use the image programmed at a first internal memory location from the update file as executable code in place of a previous version stored at a second internal memory location.

18. The system of claim 17, wherein the processor is configured to revert to the previous version for use as executable code if an error occurs while using the image as executable code.

19. The system of claim 15, wherein the processor is configured to save a current state of an update process after expiration of a finite time period following each of the key-off cycles.

20. The system of claim 19, wherein the processor is configured to resume the update process during a current key-off cycle based on the saved current state from a previous key-off cycle.

* * * * *